United States Patent [19]
Hunter

[11] 4,216,508
[45] Aug. 5, 1980

[54] TAPE CARTRIDGE TENSIONING AND EJECTING MECHANISM

[75] Inventor: Alexander Hunter, Chalfont, Pa.

[73] Assignee: Transaction Management, Inc., Montgomeryville, Pa.

[21] Appl. No.: 926,315

[22] Filed: Jul. 24, 1978

[51] Int. Cl.² ............................................. G11B 15/00
[52] U.S. Cl. ......................................... 360/93; 360/137
[58] Field of Search ...................... 360/90, 92, 93, 95, 360/96, 137, 105, 132; 242/192, 197–200, 55.19 A

[56] References Cited

U.S. PATENT DOCUMENTS

| | | | |
|---|---|---|---|
| 3,514,050 | 5/1970 | Yamamoto et al. | 242/198 |
| 3,578,261 | 2/1968 | Yamamoto | 242/199 |
| 3,614,109 | 10/1971 | Yamamoto et al. | 242/199 |
| 3,846,834 | 11/1974 | Nakamori | 360/93 |
| 4,044,391 | 8/1977 | Takahashi | 360/93 |

FOREIGN PATENT DOCUMENTS

| | | | |
|---|---|---|---|
| 2326098 | 11/1973 | Fed. Rep. of Germany | 360/93 |
| 47-12628 | 4/1972 | Japan | 360/96.4 |

*Primary Examiner*—John H. Wolff

[57] ABSTRACT

A mechanism for establishing the requisite drive tension in a magnetic tape cartridge, and, by means of the same mechanism effecting the ejectment of the cartridge at such time as the magnetic recording or transcribing operation is complete. In an alternative embodiment designed for use in situations where the magnetic tape cartridge is inserted and ejected in the vertical plane, an auxiliary spring is utilized to supplement the tensioning and ejectment forces otherwise operative.

5 Claims, 7 Drawing Figures

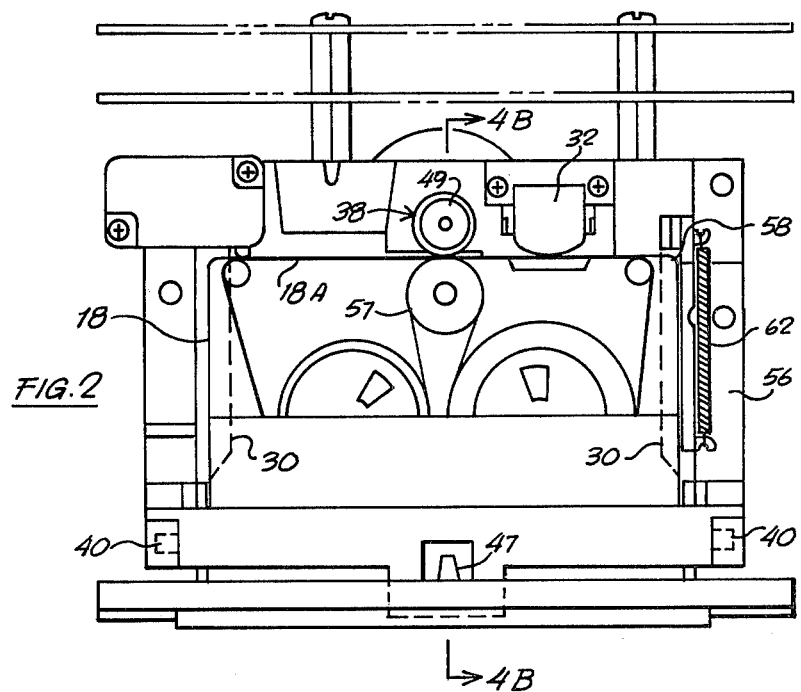
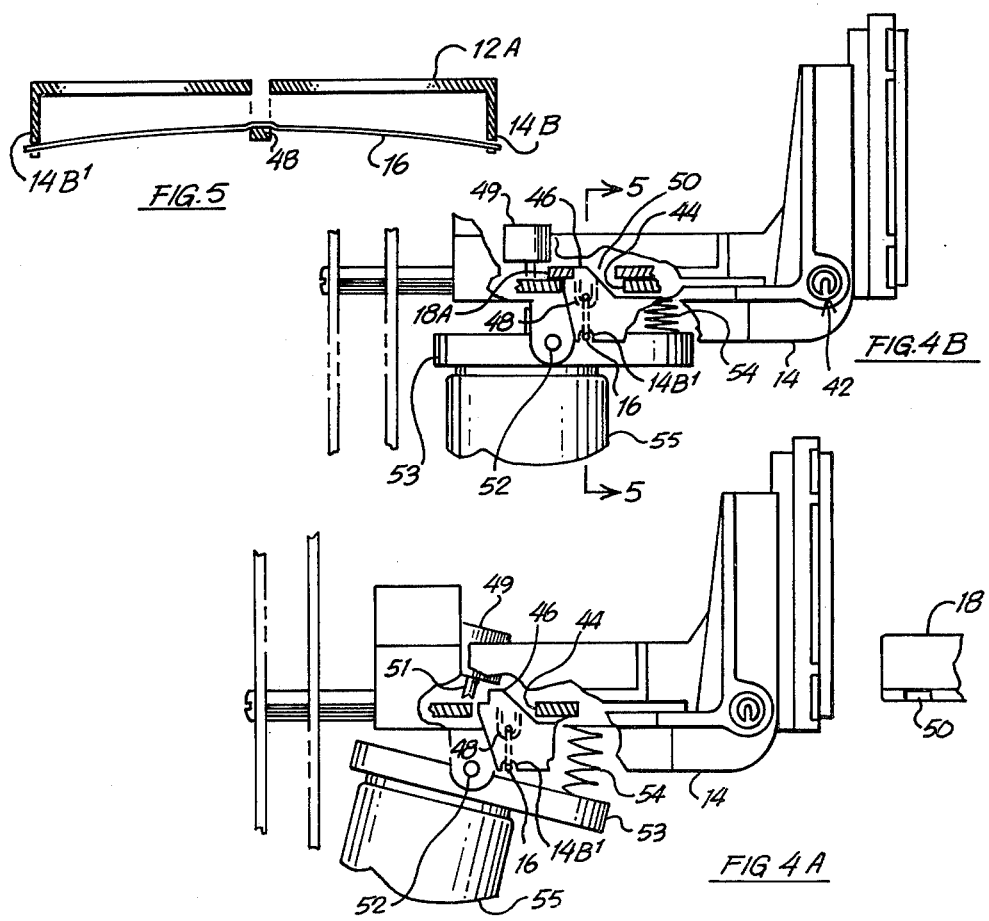

TAPE CARTRIDGE TENSIONING AND EJECTING MECHANISM

BACKGROUND OF THE INVENTION

This is an extension of the disclosure comprising application Ser. No. 918,950 filed June 29, 1978 by Alexander Hunter entitled Tape Cartridge Receiving And Locking Mechanism.

In the aforementioned Hunter application there is disclosed a mechanism for receiving and locking a magnetic tape cartridge for purposes of recording or transcribing information thereon. The present invention supplements the aforementioned disclosure in that it provides means for establishing the requisite tension to both drive the magnetic tape and to eject the tape cartridge after completion of the recording or transcription of information thereon.

In the prior art devices, including the DGD-1 Data Cartridge Drive manufactured and distributed by the 3M Company, the means for establishing the desired tension to drive the magnetic tape is mechanically independent of the cartridge ejectment mechanism. In contrast, in a preferred embodiment of the subject invention a single mechanism is used for establishing both the requisite drive tension for the magnetic tape and for subsequently ejecting the tape cartridge.

SUMMARY OF THE INVENTION

As an extension of the basic design considerations embodied in the aforementioned Cartridge Receiving and Locking Mechanism application, an attempt has been made to simplify the cartridge handler embodying the principles of the present invention by eliminating all extraneous moveable parts and, insofar as possible, combining the functions served by each such part, thereby reducing to a minimum the total number of parts required to produce an operative unit.

In furtherance of this design criteria, applicant has produced a balanced system in which the forces imparted to the capstan used to drive the magnetic tape are also used to effect the ejectment of the magnetic cartridge. The manner in which the above outlined objective is effected will become more readily apparent upon reference to the following description when considered in conjunction with the detailed drawings, which drawings form a part of the specification.

BRIEF DESCRIPTION OF THE DRAWINGS

FIG. 2 discloses in plan view, an alternative embodiment to the subject invention in which a supplemental spring is used to influence the ejection of the tape cartridge;

FIG. 3 shows a side view of the subject invention while

FIGS. 4A and 4B comprise side views of the subject invention with partial cut-aways to show details of the capstan assembly prior to insertion of the tape cartridge and with the cartridge moved into locked position;

FIG. 5 comprises a cross-sectional view taken along the lines 5—5 of FIG. 4 and depicts a biasing spring used to lock the tape cartridge in position.

DESCRIPTION OF THE INVENTION

Figure 1:
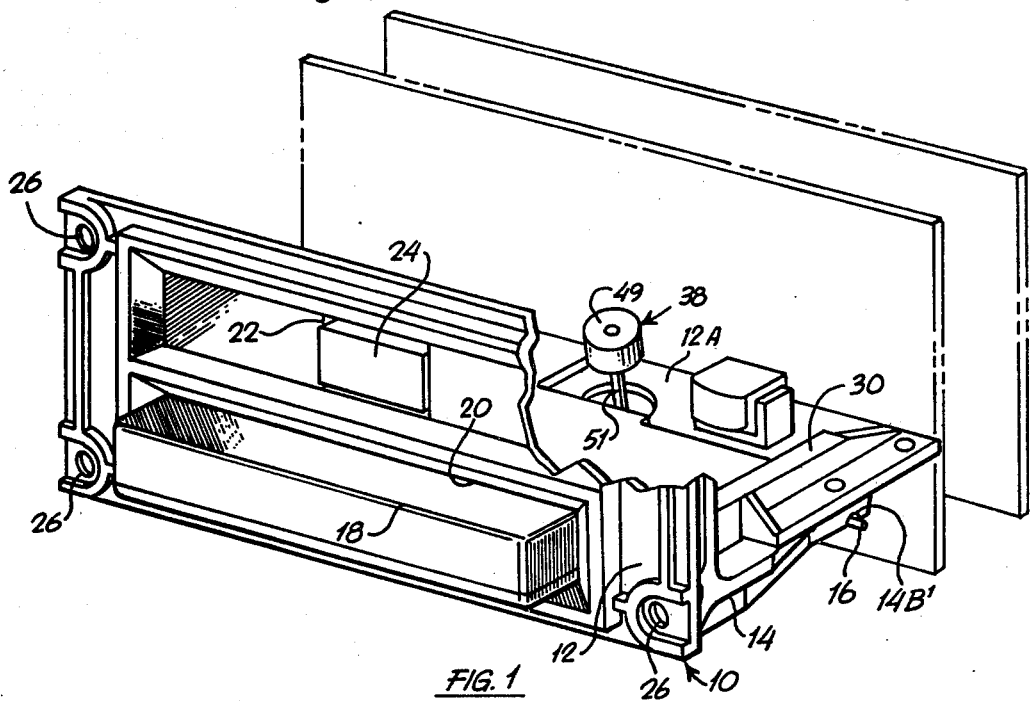
FIG. 1 comprises a front perspective view of the tape cartridge tensioning and ejecting mechanism with a partial cut-away to show details of a capstan assembly.

Referring now to FIG. 1, therein is illustrated the preferred embodiment of the Tape Cartridge Tensioning and Ejecting Mechanism generally designated therein as member 10. The tensioning and ejecting mechanism comprises the three major components disclosed and claimed in the aforementioned Cartridge Receiving and Locking Mechanism patent application Ser. No. 918,950. These in turn comprise a front plate and table portion 12, a rocker arm 14 and a relatively straight biasing spring 16. The front plate portion of member 12 is shown as having an opening 20 designed to accommodate a magnetic tape cartridge 18 of conventional design. Above the opening 20 of the front plate 12 is a cut out portion 22 through which there projects a release button 24 which in turn comprises a projection of the rocker arm 14.

Projecting perpendicularly from the front plate portion of member 12 and comprising an integral part thereof is a table portion 12A upon which the magnetic cartridge 18 is supported as it rides into locking position. Elongated guides 30 bordering each side of the table 12A restrict relative motion of the cartridge 18 to a path parallel with that of the table 12A. The location and geometric configuration of the guides 30 are defined by the physical parameters of the cartridge 18 with respect to the other operative components of the tape cartridge tensioning and ejecting mechanism. As viewed in FIG. 2, these other components include a magnetic sensing and recording head 32, a microswitch assembly 34, a photoelectric emitter (not shown) and a tape drive motor and capstan assembly 38.

The releasing rocker arm 14 is pivotally mounted on the front plate and table 12 by means of projections 40 integrally moulded to member 12. The projections 40 cooperate with recesses 42 on the rocker arm 14 thus facilitating a limited rocking motion of member 14 relative to the front plate and table 12.

As will be noted upon further reference to FIG. 2, the rocker arm 14 has a bend occurring midway up the arms of the U shaped member, proximate to the point where the rocker arm pivots about the projections 40. On the extremities of the rocker arm extensions are located two stops 46 which are designed to cooperate with cutouts 50 located on the underside of the magnetic cartridge 18. The biasing spring 16 passes through the eye of a projection 48 attached to the bottom of the table 12A (See FIG. 5). The biasing spring 16 bridges the projecting arms of the rocker arm 14 at points 14B and 14B$^1$ near the periphery thereof. The effect of spring 16 is to normally tend to project the stops 46 above the surface of the table 12A such that upon insertion of a tape cartridge through the mouth located on the front portion of the table 12, the leading edge portion 18A thereof rides over the projecting stops 46 until the latter engage the recesses 50 located on the underside of the magnetic tape cartridge under the influence of the biasing spring 16, thus effectively locking the cartridge to the table 12A. For further details of the cartridge receiving and locking mechanism reference is made to the aforementioned co-pending application of the same inventor, Ser. No. 918,950.

Reference is now made to the embodiment of the present invention disclosed in FIG. 1. As seen therein, the tape cartridge 18 has been partially inserted through the opening of the front plate 12. In this position, the leading edge 18A of the magnetic cartridge has not yet come into contact with the operative components of the cartridge tensioning and ejecting mechanism comprising the capstan assembly 38.

Figure 3:
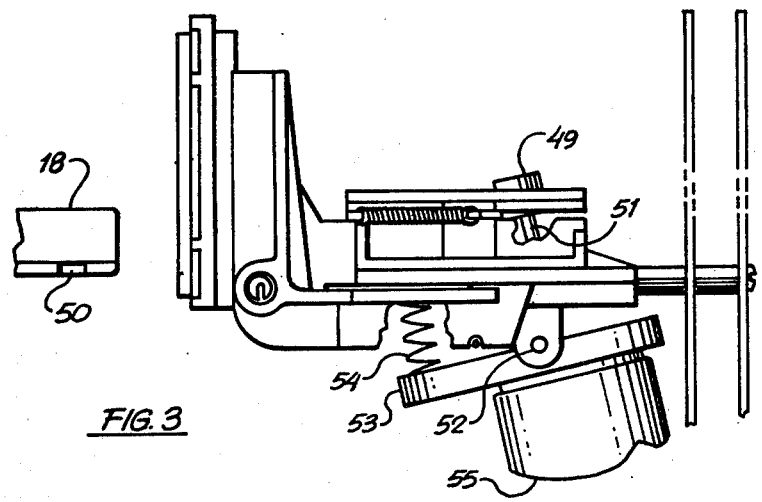
Figure 3A:
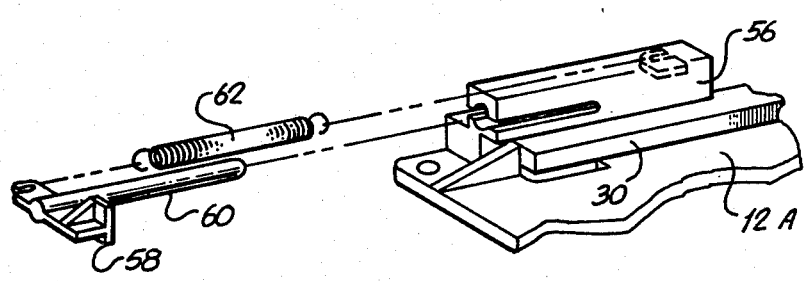
FIG. 3A depicts details of the supplemental spring of FIG. 2.

As may be seen from FIGS. 3 and 4, the capstan assembly 38 comprises a drive wheel 49 mounted on a drive shaft 51 which also serves to carry the armature of a motor 55. The capstan assembly 38 is pivotally mounted by means of a bracket 53 operatively connected so as to pivot about point 52 under the influence of a spring 54. As may be seen from FIGS. 1 and 3, in the absence of a tape cartridge the drive wheel 49 projects into the path of a magnetic tape cartridge being inserted into the subject mechanism. Thus, as a tape cartridge is inserted through the opening 20 and is moved into locking position across the table portion 12A, it comes into contact with the drive wheel 49 of the capstan assembly 38. The pressure exerted upon the magnetic tape cartridge upon insertion must be sufficient to cause the capstan assembly 38 and its associated mounting bracket 53 to pivot about their common pivot point 52 against the restoring force of the spring 54. Thus, the insertion of the magnetic tape cartridge causes a compression force to be developed within the spring 54 which in turn holds the drive wheel 49 of the capstan assembly 38 under desired tension with respect to a driven wheel 57 of the magnetic tape cartridge 18. The driven wheel 57 comprises an integral part of the tape cartridge designed for use in conjunction with the subject system, an example of which is described in detail in U.S. Pat. No. 3,692,255.

As the magnetic tape cartridge approaches its locking position on the table portion 12A the projecting stops 46 on the rocker arm 14 move into engagement with the cutouts 50 (See FIG. 4B) located on the underside of the tape cartridge 18 thus restraining the tape cartridge against further motion relative to the table portion 12A and preventing the tape cartridge from automatically being ejected due to the compressive force now stored in the spring 54. At the same time as the tape cartridge reaches its locking position the surface of the magnetic tape comes into contact with a magnetic sensing and recording head 32.

Just before the tape cartridge reaches its locked position, the capstan assembly 38, which prior to the insertion of the tape cartridge assumed a slanted position and projected into the path of the oncoming tape cartridge, is engaged by the leading edge 18A of the tape cartridge and urged out of the path thereof. Thus, as the tape cartridge reaches its locked position the capstan assembly assumes an orientation relatively perpendicular to the plane defined by the table portion. This insures that the proper tension will be developed in the magnetic tape vis-a-vis the sensing and recording head 32.

It should be clear that the re-orientation of the capstan assembly 38 with respect to the table portion, is accomplished by reason of the forces being exerted to overcome the effect of the biasing spring 54. The energy which is stored in the compression of spring 54 will subsequently be utilized in ejecting the tape cartridge. Thus, upon depressing button 24, which in turn retracts the stops 46 from the indentations 50 located on the underside of the magnetic cartridge 18, the restoring force within the spring 54 is released causing the tape cartridge to be projected through the mouth 20 so as to facilitate the ready removal thereof.

As may be seen from FIG. 2 and 3, the alternative embodiment therein disclosed embodies a supplemental restoring device comprising a housing 56 integrally mounted with respect to the table 12A such that upon insertion into the mechanism 10 of a magnetic tape cartridge, the leading edge 13A portion of said cartridge will come into contact with a projection 58 the latter being an extension of a plunger, or piston, 60 which reciprocates within the housing 56. As the tape cartridge continues to be projected across the table 12A in the direction of the capstan assembly 38, the leading edge of the tape cartridge engages the projection 58 causing the restoring spring 62 to expand such that upon subsequent depression of the button 24 the restoring force of the spring 62, acting in concert with the restoring force of the biasing spring 54, will serve to eject the tape cartridge from the mouth 20. It should be noted that the supplemental restoring force of the alternative embodiment of the present invention disclosed in FIGS. 2 and 3 is particularly designed for vertical installations of the subject Tape Cartridge Tensioning And Ejecting Mechanism.

Although the specification defines a cartridge tensioning and ejecting mechanism of preferred design it will be appreciated that the invention is not limited thereto. Accordingly, any modifications, variations, or equivalent arrangement within the scope of the appended claims should be considered to be within the scope of the invention. Having thus described in detail my invention,

I claim:

1. A tape cartridge tensioning and ejecting mechanism comprising a table portion adapted to receive a tape cartridge, guide means operatively positioned on said table portion to restrain said tape cartridge to movement along a predetermined path relative to said table portion, tape cartridge locking means adapted to lock said tape cartridge upon insertion against further relative movement with respect to said table portion; a capstan assembly for driving a tape within said tape cartridge, said capstan assembly comprising a drive wheel, a motor, and a drive shaft, said drive wheel being mounted on said drive shaft and driven by said motor; a bracket pivotally attached at a pivot point to the underside of said table portion for mounting said capstan assembly, a restoring spring operatively positioned between said bracket and said table portion; said restoring spring being normally operative in the absence of a tape cartridge to cause said drive wheel and that portion of said drive shaft of said capstan assembly which projects above the surface of the table portion upon which the tape cartridge is inserted to tilt into the path of said tape cartridge such that upon insertion of a tape cartridge into said mechanism and translation thereof across said table portion a portion of the tape within the tape cartridge comes into contact with said drive wheel of said capstan assembly which capstan assembly yields to the pressure being exerted upon said tape cartridge so as to cause said capstan assembly and its associated mounting bracket to pivot about said pivot point at the same time increasing the compression force in said restoring spring until said tape cartridge has been completely inserted into said cartridge tensioning and ejecting mechanism at which point the compressive force within said restoring spring establishes the desired tape tension and operates in conjunction with said locking means to prevent said tape cartridge from being automatically ejected, the selective ejectment of said tape cartridge being effected upon release of said locking means whereby said compressive force stored in the restoring spring causes said drive shaft and drive wheel to translate said tape cartridge across said table portion causing said tape cartridge to be ejected therefrom.

2. The tape cartridge tensioning and ejecting mechanism of claim 1 further comprising a magnetic sensing and recording head operatively positioned with respect to said operative components of said mechanism such that the tape portion of said tape cartridge comes into contact with said sensing head and establishes the desired amount of tension therebetween upon insertion of said tape cartridge into locking position with respect to said table portion.

3. A tape cartridge tensioning and ejecting mechanism comprising a capstan assembly for driving said tape, said capstan assembly comprising a drive wheel, a motor, and a drive shaft for mounting said drive wheel, said drive shaft operatively connected to the armature of said motor; a bracket for mounting said capstan assembly, a table portion adapted to receive a tape cartridge and comprising means to hold said tape cartridge against further relative movement until released, means for pivotally mounting said bracket to the underside of said table portion, and a compression spring operatively positioned with respect to said bracket and said table portion such that in the absence of a tape cartridge said capstan assembly is tilted into the path of said tape cartridge and upon insertion of a tape cartridge into operative position with respect to said table portion a portion of said tape cartridge comes into contact with said drive wheel, said capstan assembly being yieldably responsive to said cartridge being inserted into said mechanism causing said capstan assembly and said bracket to pivot about said table portion so as to establish a restoring force in said compression spring which enables said drive wheel to tension and drive the tape within a tape cartridge and upon the subsequent release of said tape cartridge enables said tape cartridge to be ejected from said table portion.

4. The tape cartridge tensioning and ejecting mechanism of claim 1 wherein the ejecting portion of said mechanism further comprises a supplemental spring-biased restoring device comprising a housing integrally mounted to said table portion proximate to said guide means for restraining the path of said tape cartridge with respect to said table portion, said housing comprising an at least partially hollowed portion, a plunger adapted to reciprocate within said hollowed portion of said housing, a spring operatively restraining movement of said plunger within said hollowed portion of said housing, said plunger further comprising a projection which protrudes from said housing into the path of a tape cartridge being inserted into said mechanism; such that as a tape cartridge is moved into locking position with respect to said table portion the leading edge of said tape cartridge comes in contact with said projection and by reason of continued pressure being exerted upon said tape cartridge said projection and the attached plunger are caused to move with said tape cartridge against the restoring forces of said springs such that release of said locking means causes said tape cartridge to move across said table portion under the combined influence of said restoring force established in the compression spring comprising said capstan assembly and the restoring force stored established in said spring interconnecting said plunger and said housing.

5. A tape cartridge tensioning and ejectment mechanism comprising drive means for driving a tape within a tape cartridge, said drive means comprising a motor operatively connected to which is a drive wheel; a table portion for receiving a tape cartridge and having means for restraining the tape of a tape cartridge against further relative motion with respect to said table portion; pivoting means for pivotally mounting said drive means with respect to said table portion; and spring biasing means operatively positioned between said table portion and said drive means and operative upon insertion of the tape cartridge into operative position with respect to said table portion such that said drive wheel comes into yieldable contact with said tape whereby said spring biasing means establishes the desired tension between said drive wheel and the tape stored in said tape cartridge during the recording and/or transcription of information onto said tape cartridge and provides the necessary restoring force operative upon the subsequent release of said tape cartridge to enable said drive wheel to effect the ejectment of said tape cartridge with respect to said table portion.

* * * * *